United States Patent
Tsou et al.

(10) Patent No.: US 10,336,845 B2
(45) Date of Patent: Jul. 2, 2019

(54) LOW ETHYLENE AMORPHOUS PROPYLENE-ETHYLENE-DIENE TERPOLYMER COMPOSITIONS

(71) Applicant: ExxonMobil Chemical Patents Inc., Baytown, TX (US)

(72) Inventors: Andy H. Tsou, Houston, TX (US); Edward J. Blok, Huffman, TX (US); Gabor Kiss, Hampton, NJ (US); Rhutesh K. Shah, Katy, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/503,146

(22) PCT Filed: Aug. 31, 2015

(86) PCT No.: PCT/US2015/047779
§ 371 (c)(1),
(2) Date: Feb. 10, 2017

(87) PCT Pub. No.: WO2016/053542
PCT Pub. Date: Apr. 7, 2016

(65) Prior Publication Data
US 2017/0233513 A1   Aug. 17, 2017

Related U.S. Application Data

(60) Provisional application No. 62/057,539, filed on Sep. 30, 2014.

(51) Int. Cl.
| | |
|---|---|
| C08L 9/00 | (2006.01) |
| C08F 210/18 | (2006.01) |
| B60C 1/00 | (2006.01) |
| C08F 290/04 | (2006.01) |
| C08L 21/00 | (2006.01) |
| C08L 23/16 | (2006.01) |
| C08K 3/013 | (2018.01) |
| C08L 7/00 | (2006.01) |
| C08F 4/659 | (2006.01) |

(52) U.S. Cl.
CPC .......... *C08F 210/18* (2013.01); *B60C 1/0016* (2013.01); *C08F 290/042* (2013.01); *C08K 3/013* (2018.01); *C08L 7/00* (2013.01); *C08L 9/00* (2013.01); *C08L 21/00* (2013.01); *C08L 23/16* (2013.01); *C08F 4/65908* (2013.01)

(58) Field of Classification Search
CPC ...... C08L 23/16; C08F 236/00; C08J 2423/00
See application file for complete search history.

(56) References Cited

U.S. PATENT DOCUMENTS

| | | | |
|---|---|---|---|
| 3,897,405 A | 7/1975 | Son et al. | |
| 4,465,829 A | 8/1984 | Graves | |
| 4,814,384 A | 3/1989 | Mitchell et al. | |
| 6,133,378 A * | 10/2000 | Davis | C08L 23/04 524/401 |
| 6,454,980 B1 | 9/2002 | Siano et al. | |
| 6,506,857 B2 | 1/2003 | Rix | |
| 6,686,419 B2 | 2/2004 | Wouters et al. | |
| 7,867,433 B2 | 1/2011 | Jacob et al. | |
| 8,431,065 B2 | 4/2013 | Jacob | |
| 8,742,019 B2 | 6/2014 | Jacob et al. | |
| 8,841,383 B2 | 9/2014 | Rodgers et al. | |
| 9,023,906 B2 | 5/2015 | Okamoto et al. | |
| 9,040,601 B2 | 5/2015 | Jacob | |
| 9,273,163 B2 | 3/2016 | Crowther et al. | |
| 9,527,933 B2 | 12/2016 | Kuikarni et al. | |
| 2003/0162926 A1 | 8/2003 | Wouters et al. | |
| 2006/0183861 A1 | 8/2006 | Harrington et al. | |
| 2007/0167553 A1 | 7/2007 | Westwood et al. | |
| 2009/0115108 A1 * | 5/2009 | Rodgers | B60C 1/0025 264/331.15 |
| 2012/0245293 A1 | 9/2012 | Crowther et al. | |
| 2012/0245300 A1 | 9/2012 | Crowther et al. | |
| 2013/0035442 A1 | 2/2013 | Tsou et al. | |

FOREIGN PATENT DOCUMENTS

| | | |
|---|---|---|
| EP | 1 008 464 A | 6/2000 |
| WO | 2005/049670 | 6/2005 |
| WO | 2016/053541 | 4/2016 |

* cited by examiner

*Primary Examiner* — Gregory Listvoyb

(57) ABSTRACT

A propylene-ethylene-diene terpolymer and method of making such comprising from 2% to 25% wt % by weight of ethylene, from 98% to 75% wt % by weight propylene and from 1% to 21% wt % by weight of a diene, wherein the terpolymer has a crystallinity of less than 3%, a melt flow rate (MFR) of less than 10 and a Tg by DSC of from −2° C. to −25° C. and methods to prepare the terpolymer are depicted.

23 Claims, 2 Drawing Sheets

US 10,336,845 B2

LOW ETHYLENE AMORPHOUS PROPYLENE-ETHYLENE-DIENE TERPOLYMER COMPOSITIONS

PRIORITY CLAIM TO RELATED APPLICATIONS

This application is a National Stage Application of International Application No. PCT/US2015/047779 filed Aug. 31, 2015, which claims priority to U.S. Ser. No. 62/057,539, filed Sep. 30, 2014, entitled "Propylene-Based Polymer Additives for Improved Tire Tread Performance", the contents of which are incorporated herein in their entirety for all purposes.

FIELD OF THE INVENTION

The present invention relates to propylene-ethylene-diene (PEDM) terpolymers useful as modifiers for tire treads.

BACKGROUND OF THE INVENTION

The tire tread compound is an important compound in a tire that dictates wear, traction, and rolling resistance. It is a technical challenge to deliver excellent traction, low rolling resistance while providing good tread wear. The challenge lies in the trade-off between wet traction and rolling resistance/tread wear. Raising the compound Tg would provide better wet traction but, at the same time, increase the rolling resistance and tread wear. There are needs to develop a tread compound additive that can provide good wet traction without increasing the rolling resistance and tread wear.

Functionalized SBR (styrene butadiene rubber) is one method to improve this trade-off by improving filler dispersion. Nanoprene™, sub-micron to micron sized gels from Lanxess with cross-linked butadiene cores and acrylic shells, is another additive used to increase the wet traction without affecting rolling resistance. However, Nanoprene can only deliver limited improvement in wet traction. What is needed is a polymeric additive to improve the balance between tread wear and rolling resistance that is compatible with the most common tire tread components.

Related references include U.S. Pat. Nos. 9,040,601, 8,742,019, 8,431,065, 7,867,433, 6,686,419, US 2012/0245293, US 2012/0245300; U.S. Ser. No. 61/704,611 filed on Sep. 24, 2012; and U.S. Ser. No. 61/704,725 filed on Sep. 24, 2012.

SUMMARY OF THE INVENTION

Described herein is an propylene-ethylene-diene terpolymer comprising from 2% to 25 wt % by weight of ethylene, from 98% to 75 wt % by weight propylene and from 1% to 20 wt % by weight of a diene, wherein the terpolymer has a crystallinity of less than 3%, a melt flow rate (MFR) of less than 10 and a Tg by DSC of from −2° C. to −25° C.

Tire tread compositions are also disclosed that include components, by weight of the composition, within the range from: 5 to 75 wt % by weight of a diene elastomer; 0 to 40 wt % by weight of processing oil; 20 to 80 wt % by weight of filler; a curative agent; and 5 to 30 wt % by weight of the propylene-ethylene-diene terpolymer described herein.

Also disclosed is a method of balancing the wet traction performance and rolling resistance in a tire tread comprising combining at least a filler, a diene-elastomer, and a curative agent with the propylene-ethylene-diene terpolymer described herein; and effecting a cure of the components to form a tire tread; wherein the level of the propylene-ethylene-diene terpolymer relative to the other components, and its comonomer content, can be varied to improve the balance of wet traction and rolling resistance of a tire tread.

DETAILED DESCRIPTION OF THE INVENTION

Figure 1:
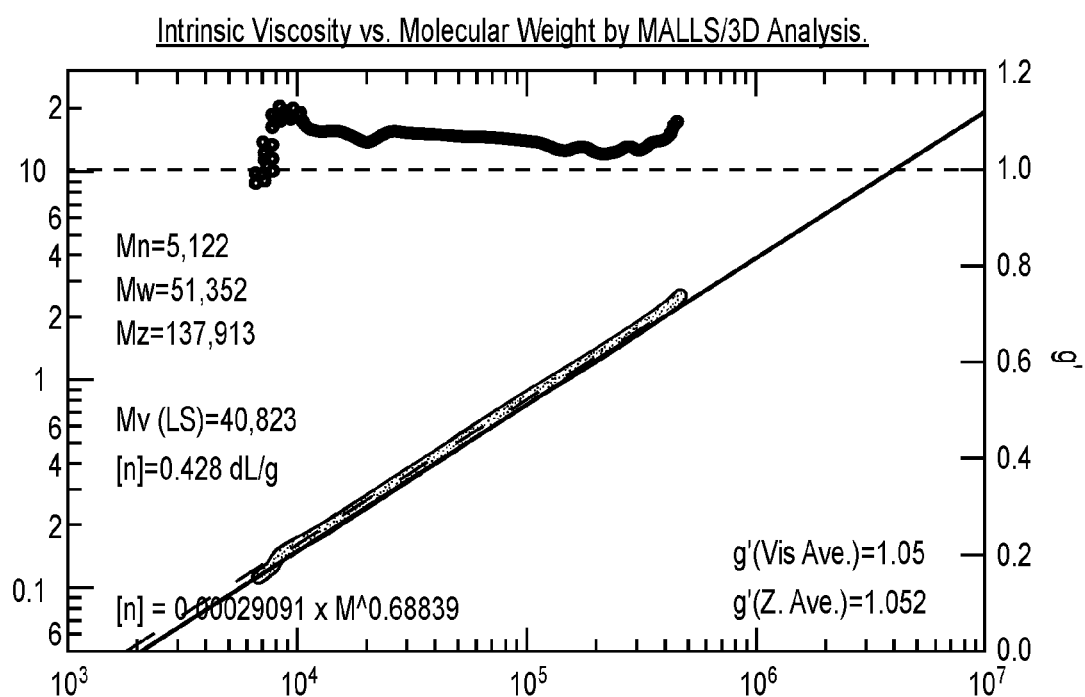
FIG. 1 depicts a GPC 3D plot of g' vs MW for Example 1 demonstrating no branching and no macromer incorporation.

This invention is directed to propylene-ethylene-diene terpolymer compositions, the preparation and the use of propylene-ethylene-diene terpolymer polymers in tire tread compositions. The propylene-ethylene-diene terpolymer polymers are prepared by polymerizing propylene with ethylene, and, optionally, one or more dienes such as ethylidene norbornene.

Embodiments are directed to the synthesis of amorphous random terpolymers of ethylene, propylene, and a non-conjugated diene by coordinative insertion polymerization using metallocene catalysts having Cs symmetry with ethylene weight % from 2% to 25% (balanced by propylene), non-conjugated diene, where ethylidene norbornene (ENB) is most preferred, from 1 wt % by weight to 20 wt % by weight, with crystallinity that is less than 3%, with a melt flow rate (MFR) less than 10, and with a Tg (by DSC) from −2° C. to −25° C. A particular metallocene with Cs symmetry is the bridged (2,7-di-t-butylfluorenyl)(cyclopentadienyl)hafnium dimethyl and its derivatives activated with a non-coordinated anion where dimethylanilinium tetrakis (pentafluorophenyl) borate is an activator. The polymerization is preferably conducted at temperatures above 50° C. and with ethylene monomer feed by more than 2%.

The tire tread composition is an important aspect in a tire that dictates wear, traction, and rolling resistance. It is a technical challenge to deliver excellent traction and low rolling resistance while providing good tread wear. The challenge lies in the trade-off between wet traction and rolling resistance/tread wear. Raising the composition's Tg would provide good wet traction but, at the same time, increase the rolling resistance and tread wear. The embodiments described herein provide a tread compound additive that can accomplish wet traction without compromising the rolling resistance and tread wear.

It is desirable to have an amorphous crosslinkable high-molecular-weight thermoset rubber with Tg ranging from −2° C. to −25° C. to be used as a tire tread additive having immiscible domains in tread compounds so to deliver a glass transition to the compound at a temperature that would provide wet and dry tractions (in accordance to time-temperature correspondence principle, dry and wet traction frequencies are equivalent to low temperatures of −2° C. to −25° C.). The glass transition leads to damping and energy absorption and, in turn, enhances the traction. This means that it is preferred to have an propylene-ethylene-diene elastomer where the diene can provide crosslinking sites at 1 wt % to 20 wt % by weight and the ethylene content from 2% to 25% so as to have the Tg from −2 C to −25° C. Due to their multi-site nature, conventional Ziegler-Natta catalyst for EPDM (ethylene propylene diene terpolymer where the diene is typically ethylidene norbornene (ENB) or 5-vinyl-2-norbornene (VNB)), such as vanadium chloride, cannot be used to synthesize low ethylene EPDM of uniform compositions and high molecular weight (MW is severely limited when high amount of propylene monomer is fed into the conventional vanadium catalyzed reactor). The metallocene catalysts used to prepare ethylene-propylene copolymers with majority propylene (where ethylene content is less 15%) are all of C2 symmetry which would lead to isotactic polypropylene sequence and isotactic polypropylene crystallinity (not amorphous, but semi-crystalline). Additionally, most, if not all, of these metallocene catalysts have both MW and diene comonomer incorporation limitations.

A bridged (2,7-di-t-butylfluorenyl)(cyclopentadienyl)hafnium dimethyl catalyst, which can be considered as a metallocene catalyst with Cs symmetry, (U.S. Pat. No. 6,506,857), has been used to produce multimodal EPDMs (U.S. Pat. No. 6,686,419) where the ethylene content is greater than 35 mol %. This catalyst would not lead to isotactic polypropylene sequences. However, this catalyst was found experimentally unable to incorporate ENB when only propylene and ENB were used as the monomers. Further, this catalyst was incapable of incorporating vinyl terminated macromers when only propylene was used as the other monomer. The propylene backbone may have crowded the metallocene catalyst center thus, disallows the insertion of large comonomer, such as the conjugated dienes or vinyl terminated macromers.

Not to be limited by theory, it is believed that adding small amount of ethylene, with ethylene content greater than 2 wt % by weight, this bridged (2,7-di-t-butylfluorenyl)(cyclopentadienyl) hafnium dimethyl catalyst has now been found to be able to incorporate diene comonomers since the ethylene sequence on the backbone opens up the metallocene metal center allowing the insertion of diene comonomer. It was found that amorphous EPDM can be produced having desirable MW and compositions with ethylene content less than 25 wt % by weight where the polypropylene sequences are non-crystallizable atactic provided that the polymerization temperature is kept at above 50° C. Despite the Cs symmetry of this catalyst, syndiotactic polypropylene backbone sequences, which are crystallizable although a lot slower than those of isotactic polypropylene, can only be produced when the polymerization temperature is kept below 50° C.

Other suitable Cs symmetric catalysts are described in U.S. Pat. No. 6,218,488 and 6,300,433 and in (i) Razavi et al., J. Organomet. Chem. 684 (2003) 206, (ii) Razavi et al., Macromol. Chem. Phys. 205 (2004) 347, and (iii) L. Resconi et al. Chem. Rev. 100 (2000) 12530. Such catalysts include $C_s$-symmetric Group 4 metallocenes comprising any two ligands selected from cyclopentadienyl ligands and ligands isolobal to cyclopentadienyl. Ligands isolobal to cyclopentadienyl are selected from cyclopentadienyl, cyclopentaphenanthrenyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl), substituted versions thereof, and heterocyclic versions thereof. Embodiments include, for example, catalyst precursor is selected from the following structures:

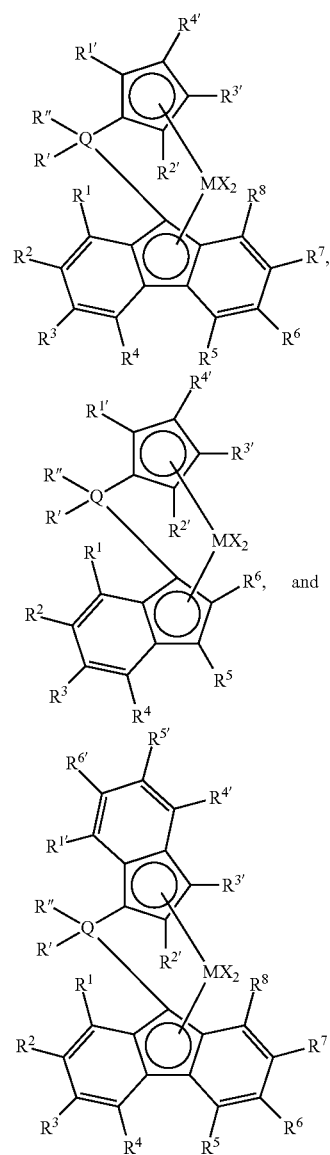

wherein:
M is a Group 4 metal, preferably zirconium or hafnium, most preferably hafnium;
Q is silicon or carbon;
R' and R'' are selected from phenyl, alkyl substituted phenyl, and silyl substituted phenyl, most preferably C1 to C5 alkylsilyl-p-phenyl.
each X is independently selected from C1 to C10 alkyls, phenyls, and halogens;
each of R1 to R8 is independently selected from hydrogen, C1 to C10 alkyls, phenyls, and alkylphenyls; most preferably R1, R3 to R6, and R8 are hydrogen and the R2 and R7 groups are selected from iso-propyl, iso-butyl, tert-butyl, phenyl, alkylphenyl, and dialkylphenyl; and
each of R1' to R6' is independently selected from hydrogen, C1 to C10 alkyls, and phenyls.

The problem identified above has been previously been approached by developing an additive, a polypropylene-ethylene-diene terpolymer that increases hysteresis in the wet traction region (0° C.) and lowers hysteresis in the rolling resistance region (60° C.) without changing the overall compound Tg.

Prior to the present invention, the additive compounding step allows one to address the known deficiencies of polyolefin blends with styrene-butadiene rubber/polybutadiene/natural rubber (SBR/PBD/NR) compositions by concentrating the carbon black and antioxidant in the polyolefin domain to improve abrasion resistance, cure state and UV stability. These deficiencies include poorly vulcanized and poorly reinforced polyolefin domains as curatives and fillers migrate away from the polyolefin due to unfavorable solubility parameter differences. The present embodiments described herein overcome one or more of these deficiencies.

Propylene-ethylene-diene Terpolymer

The "propylene-ethylene-diene terpolymer" as used herein may be any polymer comprising ethylene, propylene, a diene and other comonomers, such as styrene or norbornene. The term "polymer" refers to any carbon-containing compound having repeat units from one or more different monomers. Preferably the propylene-ethylene-diene based polymer comprises ethylene—derived units, propylene-derived units, and, optionally, diene-derived units. For example, the propylene-ethylene-diene terpolymer may be an ethylene propylene-α-olefin-diene terpolymer. The propylene-ethylene-diene terpolymers may be prepared by polymerizing ethylene and propylene with one or more dienes.

The comonomers may be linear or branched. Preferred linear comonomers include ethylene or $C_3$ to $C_8$ α-olefins, more preferably ethylene, propylene, 1-butene, 1-hexene, and 1-octene, even more preferably ethylene or propylene. Preferred branched comonomers include 4-methyl-1-pentene, 3-methyl-1-pentene, 2-ethyl-1-butene, and 3, 5, 5-trimethyl-1-hexene. In one or more embodiments, the comonomers may include styrene.

The dienes may be conjugated or non-conjugated. Preferably, the dienes are non-conjugated. Illustrative dienes may include, but are not limited to, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene ; 1,3-cyclopentadiene; 1,4-cyclohexadiene; vinyl norbornene (VNB); dicyclopendadiene (DCPD); and combinations thereof. Preferably, the diene is ENB or VNB.

The propylene-ethylene-diene terpolymer may have a ethylene amount of from 2 wt % by weight to 25 wt % by weight, or from 5 wt % by weight to 25 wt % by weight, or from 10 wt % by weight to 25 wt % by weight, or from 15 wt % by weight to 25 wt % by weight, or from 20 wt % by weight to 25 wt % by weight, or from 5 wt % by weight to 20 wt % by weight, or from 5 wt % by weight to 15 wt % by weight, or from 5 wt % by weight to 10 wt % by weight, or from 10 wt % by weight to 20 wt % by weight or from 15 wt % by weight to 20 wt % by weight based on the weight of the polymer. The balance of the propylene-ethylene-diene terpolymer comprises propylene and, optionally, one or more dienes.

Preferably, the propylene-ethylene-diene terpolymer comprises a diene content of from 1 wt % by weight to 21 wt % by weight based on the weight of the polymer, or from 1.5 wt % by weight to 15 wt % by weight, or from 2 wt % by weight to 15 wt % by weight, or 3 wt % by weight to 10 wt % by weight, or from 4 wt % by weight to 8 wt % by weight. Other preferred ranges may include from 1 wt % by weight to 18 wt % by weight, or from 1 wt % by weight to 15 wt % by weight, or from 1 wt % by weight to 1-wt % by weight, or from 10 wt % by weight to 21 wt % by weight, or from 3 wt % by weight to 12 wt % by weight, or from 5 wt % by weight to 12 wt % by weight based on the weight of the polymer. In one or more embodiments, the propylene-ethylene-diene terpolymer may comprise 5-ethylidene-2-norbornene in an amount of from 1 wt % by weight to 21 wt % by weight, or from 1.5 wt % by weight to 15 wt % by weight, or from 3 wt % by weight to 20 wt % by weight, or from 4 wt % by weight to 20 wt % by weight, or from 5 wt % by weight to 20 wt % by weight.

The propylene-ethylene-diene terpolymer may have a weight average molecular weight (Mw) of 5,000,000 or less, a number average molecular weight (Mn) of 3,000,000 or less, a z-average molecular weight (Mz) of 10,000,000 or less, and a g' index of 0.95 or greater measured at the weight average molecular weight (Mw) of the polymer using isotactic polypropylene as the baseline, all of which may be determined by size exclusion chromatography as described below. The propylene-ethylene-diene terpolymer may have an Mn of from 5,000 to 5,000,000 g/mole, or from 10,000 to 1,000,000 g/mole, or from 20,000 to 500,000 g/mole, or from 50,000 to 400,000 g/mole.

The molecular weight distribution index (MWD=(Mw/Mn)), sometimes referred to as a "polydispersity index" (PDI), of the propylene-ethylene-diene terpolymer may be from 1.2 to 40. For example, the propylene-ethylene-diene terpolymer may have an MWD with an upper limit of 40, or 20, or 10, or 9, or 7, or 5, and a lower limit of 1.2, or 1.5, or 1.7. In one or more embodiments, the MWD of the propylene-ethylene-diene terpolymer is 1.5 to 7, or from 1.7 to 5.

The propylene-ethylene-diene terpolymer may have a g' index value of 0.95 or greater, or at least 0.98, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the propylene-ethylene-diene terpolymer and $\eta_l$ is the intrinsic viscosity of a linear polymer of the same viscosity-averaged molecular weight ($M_v$) as the propylene-ethylene-diene terpolymer. Thus, $\eta_l = KM_v^\alpha$, where K and α are measured values for linear polymers and should be obtained on the same instrument as the one used for the g' index measurement, which is described above for the GPC-SEC method below for determining molecular weights.

The propylene-ethylene-diene terpolymer may have a density of from 0.83 g/cm³ to 0.92 g/cm³, or from 0.85 g/cm³ to 0.91 g/cm³, or from 0.85 g/cm³ to 0.90 g/cm³, at room temperature as measured per the ASTM D-1505 test method.

The propylene-ethylene-diene terpolymer may have a melt flow rate (MFR, 2.16 kg weight at 230° C.), equal to or greater than 0.2 g/10 min as measured according to the ASTM D-1238. Preferably, the MFR (2.16 kg at 230° C.) is from 0.2 g/10 min to 200 g/10 min, or from 0.2 g/10 min to 100 g/10 min, or from 0.2 g/10 min to 50 g/10 min, or from 0.2 g/10 min to 30 g/10 min, or from 0.2 g/10 min to 25 g/10 min, or from 0.5 g/10 min to 25 g/10 min.

The propylene-ethylene-diene terpolymer may have a Mooney viscosity ML (1+4)at 125° C., as determined according to ASTM D1646, of greater than 5, or greater than 10, or greater than 15, or greater than 20.

The propylene-ethylene-diene terpolymer may have a heat of fusion ($H_f$) determined by the DSC procedure described herein, which is greater than or equal to 0 Joules per gram (J/g), and is equal to or less than 50 J/g, or equal to or less than 40 J/g, or equal to or less than 30 J/g, or equal to or less than 20J/g, or equal to or less than 10 J/g, or equal to or less than 7 J/g. Preferred propylene-ethylene-diene terpolymers may have a heat of fusion ranging from a lower limit of 0 J/g, to an upper limit of 7 J/g, or 10 J/g, or 20 J/g, or 30 J/g, or 40 J/g or 50 J/g.

The crystallinity of the propylene-ethylene-diene terpolymer may be expressed in terms of percentage of crystallinity (i.e., % crystallinity), as determined according to the DSC procedure described herein. The propylene-ethylene-diene terpolymer may have a % crystallinity of less than 15%, or less than 10%, or less than 5%, or less than 3%. In some embodiments, the propylene-ethylene-diene terpolymer may have a % crystallinity of from 0% to 3%, or from 0.05% to 3%, or from 0.1% to 3%. In one or more embodiments, the propylene-ethylene-diene terpolymer may have crystallinity of less than 3%, or from 0.25% to 3%, or from 0.5% to 3%, or from 0.75% to 2%. (The degree of crystallinity is determined by dividing heat of fusion measured with the heat of fusion for 100% crystalline polypropylene which has the value of 207 J/g (B. Wunderlich, Thermal Analysis, Academic Press, 1990, pp. 417-431.)

The propylene-ethylene-diene terpolymer preferably may have a single broad melting transition. However, the propylene-ethylene-diene terpolymer may show secondary melting peaks adjacent to the principal peak, but for purposes herein, such secondary melting peaks are considered together as a single melting point, with the highest of these peaks (relative to baseline as described herein) being considered as the melting point of the propylene-ethylene-diene terpolymer. Most embodiments described herein were amorphous and did not melt.

The propylene-ethylene-diene terpolymer may have a melting point, as measured by the DSC procedure described herein, of equal to or less than 100° C., or less than 90° C., or less than 80° C., or less than or equal to 75° C. In one or more embodiments, the propylene-ethylene-diene terpolymer may have a melting point of from 10° C. to 80° C., or from 15° C. to 75° C., or from 20° C. to 70° C.

The propylene-ethylene-diene terpolymer can have a Tg range, as determined by the DSC procedure described herein, from −25° C. to −2° C., or from −20° C. to −2° C., or from −15° C. to −2° C., or from −10° C. to −2° C. or from −5° C. to −2° C.

The Differential Scanning calorimetry (DSC) procedure may be used to determine heat of fusion and melting temperature of the propylene-ethylene-diene terpolymer. The method is as follows: approximately 6 mg of material placed in microliter aluminum sample pan. The sample is placed in a Differential Scanning calorimeter (Perkin Elmer or TA Instrument Thermal Analysis System) and is heated from ambient to 210° C. at 10° C./minute and held at 210° C. for 5 minutes. Afterward, the sample is cooled down to −40° C. at 10° C./minute and this cooling curve is used to measure the Tg. The sample is held at −40° C. for 5 minutes and then heated from −40° C. to 210° C. at 10° C./minute. During the second heating cycle, appearance of melting indicates crystallinity and thus measured heat of fusion is used to compute the crystallinity. The thermal output, recorded as the area under the melting peak of the sample, is a measure of the heat of fusion and may be expressed in Joules per gram of polymer. The melting point is recorded as the temperature of the greatest heat absorption within the range of melting of the sample relative to a baseline measurement for the increasing heat capacity of the polymer as a function of temperature.

The propylene-ethylene-diene terpolymer may be a blend of discrete random propylene-ethylene-diene terpolymers as long as the polymer blend has the properties of the propylene-ethylene-diene terpolymer as described herein. The number of propylene-ethylene-diene terpolymers may be three or less, or two or less. In one or more embodiments, the propylene-ethylene-diene terpolymer may include a blend of two propylene-ethylene-diene terpolymers differing in the olefin content, the diene content, or the both. Preparation of such polymer blend may be found in US 2004/0024146 and US 2006/0183861.

The inventive compositions may include the propylene-ethylene-diene terpolymer in an amount of from 5 wt % by weight to 99 wt % by weight, e.g., 5 wt % by weight to 30 wt % by weight, based on the weight of the composition. Preferably, the composition includes the propylene-ethylene-diene terpolymer in an amount of from a low of 5 wt % by weight, or 10, wt % by weight, or 15 wt % by weight, or 20 wt % by weight, or 25 wt % by weight, or 30 wt % by weight, or 35 wt % by weight, or 40 wt % by weight, or 50 wt % by weight, or 60 wt % by weight, or 70 wt % by weight, or 75 wt % by weight, to an upper limit of 70 wt % by weight, or 80 wt % by weight, or 85 wt % by weight, or 90 wt % by weight, or 95 wt % by weight, based on the weight of the composition so long as the low value is less than the high value.

The inventive tire tread compositions may include the propylene-ethylene-diene terpolymer in an amount of from 5 wt % by weight to 60 wt % by weight, e.g., 5 wt % by weight to 30 wt % by weight, based on the weight of the composition. Preferably, the composition includes the propylene-ethylene-diene terpolymer in an amount of from a low of 1 wt % by weight, or 3, wt % by weight, or 5 wt % by weight, to an upper limit of 30 wt % by weight, or 40 wt % by weight, or 50 wt % by weight, or 60 wt % by weight, based on the weight of the composition so long as the low value is less than the high value.

Elastomers

The inventive tire tread compositions also comprise an elastomer. Generally the range of the elastomer is from 5 to 75 wt % by weight of the tire tread composition. Suitable elastomers include, for example, diene elastomers.

"Diene elastomer" is understood to mean, in known manner, an elastomer resulting at least in part (homopolymer or copolymer) from diene monomers (monomers bearing two double carbon-carbon bonds, whether conjugated or not).

A diene elastomer can be "highly unsaturated," resulting from conjugated diene monomers, which have a greater than 50% molar content of units.

In one embodiment, the tire tread composition can include 4 to 20 wt % by weight of a polyolefin-polybutadiene block-copolymer, wherein the polyolefin-polybutadiene block-copolymer is a block copolymer having the general formula: PO-XL-fPB; where "PO" is a polyolefin block having a weight average molecular weight within the range from 1000 to 150,000 g/mole, the "fPB" is a functionalized polar polybutadiene block having a weight average molecular weight within the range from 500 to 30,000 g/mole, and "XL" is a cross-linking moiety that covalently links the PO and fPB blocks; and wherein the Maximum Energy Loss (Tangent Delta) of the immiscible polyolefin domain is a temperature within the range from −30° C. to 10° C.

Although any styrenic copolymer is useful, those most desirable in the tire compositions are styrene-butadiene block copolymer "rubbers." Such rubbers preferably have from 10 or 15 or 20 wt % by weight to 30 or 25 or 40 wt % by weight styrene derived units, by weight of the block copolymer, and within the range of from 30 or 40 or 45 wt % by weight to 55 or 60 or 65 wt % by weight vinyl groups.

Useful tire tread compositions can also comprise 15 to 50 or 60 wt % by weight of a styrenic copolymer; 0 or 5 wt % by weight to 60 wt % by weight of a polybutadiene polymer; 0 to 60 wt % by weight of natural rubber or synthetic polyisoprene; 15 to 50 or 60 wt % by weight of a functionalized styrenic copolymer; 0 or 5 wt % by weight to 60 wt % by weight of a functionalized polar polybutadiene polymer; 0 or 5 wt % by weight to 60 wt % by weight of natural rubber or functionalized synthetic polyisoprene; 0 or 5 wt % by weight to 20 or 40 wt % by weight of processing oil; 20 wt % by weight to 60 wt % by weight of filler, especially silica-based filler as described herein; a curative agent; and 5 wt % by weight to 30 wt % by weight of a propylene-ethylene-diene terpolymer described herein, and 0 or 5 wt % by weight to 40 wt % by weight of a hydrocarbon resin, the weight percentages based on the total composition.

Inorganic Filler

The term "filler" as used herein refers to any material that is used to reinforce or modify physical properties, impart certain processing properties, or reduce cost of an elastomeric composition.

Examples of preferred filler include, but are not limited to, calcium carbonate, clay, mica, silica, silicates, talc, titanium dioxide, alumina, zinc oxide, starch, wood flour, carbon black, or mixtures thereof. The fillers may be any size and range, for example in the tire industry, from 0.0001 μm to 100 μm.

Use may be made of any type of reinforcing filler known for its capabilities of reinforcing a rubber composition, which can be used for the manufacture of tires, for example, an organic filler, such as carbon black, a reinforcing inorganic filler, such as silica, or a blend of these two types of filler, in particular a blend of carbon black and silica.

The term "reinforcing inorganic filler" should be understood, in the present patent application, by definition, as meaning any inorganic or mineral filler, whatever its color and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

When the compositions of the invention are intended for tire treads with a low rolling resistance, the reinforcing inorganic filler used, in particular if it is silica, preferably has a BET surface of from 45 to 400 m$^2$/g, more preferably of from 60 to 300 m$^2$/g.

Coupling Agent

As used herein, the term "coupling agent" is meant to refer to any agent capable of facilitating stable chemical and/or physical interaction between two otherwise non-interacting species, e.g., between a filler and a diene elastomer. Coupling agents cause silica to have a reinforcing effect on the rubber. Such coupling agents may be pre-mixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

Plasticizer

As used herein, the term "plasticizer" (also referred to as a processing oil), refers to a petroleum derived processing oil and synthetic plasticizer. Such oils are primarily used to improve the processability of the composition. Suitable plasticizers include, but are not limited to, aliphatic acid esters or hydrocarbon plasticizer oils such as paraffinic oils, aromatic oils, naphthenic petroleum oils, and polybutene oils. A particularly preferred plasticizer is naphthenic oil, which is commercially available by Nynas under the trade name Nytex™ 4700.

Antioxidant

As used herein, the term "antioxidant" refers to a chemical that combats oxidative degradation. Suitable antioxidants include diphenyl-p-phenylenediamine and those disclosed in *The Vanderbilt Rubber Handbook* (1978), Pages 344 to 346. A particularly preferred antioxidant is para-phenylenediamines, which is commercially available by Eastman under the trade name Santoflex™ 6P PD (N-(1,3-Dimethylbutyl)-N'-phenyl-1,4-phenylenediamine).

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry. A preferred agent is sulfur.

Processing

The inventive tire tread composition may be compounded (mixed) by any conventional means known to those skilled in the art. The mixing may occur in a single step or in multiple stages. For example, the ingredients are mixed in at least two stages, namely at least one non-productive stage followed by a productive mixing stage. The terms "non-productive" and "productive" mix stages are well known to those having skill in the rubber mixing art. The elastomers, polymer additives, silica and silica coupler, and carbon black, if used, are generally mixed in one or more non-productive mix stages. Most preferably, the polymers are mixed first at 110° C. to 130° C. for 30 seconds to 2 minutes, followed by addition of the silica, silica coupler and other ingredients, the combination of which is further mixed, most preferably at an increasing temperature up to 140° C. to 160° C. for 30 seconds to 3 or 4 minutes. Most desirably the silica is mixed in portions, most preferably one half, then the second half. The final curatives are mixed in the productive mix stage. In the productive mix stage, the mixing occurs at a temperature, or ultimate temperature, lower than the mix temperature(s) of the preceding nonproductive mix stage(s).

The tire tread composition has many desirable properties when the propylene-ethylene-diene terpolymer is present in the compositions. Also, the maximum Energy Loss (Tangent Delta, wherein the slope is zero) of the immiscible polyolefin domain of the cured composition is preferably a temperature within the range from −30 to 10° C. or −25 or −20 or −10° C. to −5 or 0 or 10° C. Finally, domains comprising the compatibilizer in the polymer matrix of the other components have sizes that are preferred to be less than 20 microns, more preferably less than 10 microns, and most preferably less than 5 microns; or within a range of from 0.1 or 0.2 or 0.5 or 1.0 microns to 5 or 10 or 20 microns.

Additionally, the PEDMs described herein could potentially be used as tougheners in TPO (thermoplastic polyolefins). The polypropylene-ethylene-dienes described herein have good compatibility, especially with polypropylene, which is often the matrix material in a TPO. In TPO toughening, the percent incorporation of the propylene-ethylene-diene ranges 5 to 45 wt % by weight (preferably from 10 to 30 wt % by weight).

The various descriptive elements and numerical ranges disclosed herein for the propylene-ethylene-diene terpolymers, the reactants used to make the propylene-ethylene-diene terpolymers, and their use in tire tread compositions can be combined with other descriptive elements and numerical ranges to describe the invention(s); further, for a given element, any upper numerical limit can be combined with any lower numerical limit described herein. The features of the invention are described in the following non-limiting examples.

EXAMPLES

Molecular weights (number average molecular weight (Mn), weight average molecular weight (Mw), and z-average molecular weight (Mz)) were determined using a Polymer Laboratories Model 220 high temperature GPC-SEC equipped with on-line differential refractive index (DRI), light scattering (LS), and viscometer (VIS) detectors. It used three Polymer Laboratories PLgel 10 m Mixed-B columns for separation using a flow rate of 0.54 ml/min and a nominal injection volume of 300 μL. The detectors and columns were contained in an oven maintained at 135° C. The stream emerging from the SEC columns was directed into the miniDAWN (Wyatt Technology, Inc.) optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun, P. Brant, R. R. Chance, and W. W. Graessley, in 34(19) MACROMOLECULES, 6812-6820, (2001).

Effect of Ethylene Feed on Macromer Insertion

A continuous stirred tank reactor system with two reactors configured in series was used to prepare examples 1-4. The first reactor was a 0.5-liter and the second reactor was a 1 liter. Both reactors were stainless steel autoclave reactor and were equipped with a stirrer, a water cooling/steam heating element (with a temperature controller), and a pressure controller. Solvents and comonomers were first purified by passing through a three-column purification system. The purification system consisted of an Oxiclear column (Model # RGP-R1-500 from Labclear) followed by a 5A and a 3A molecular sieve column. Purification columns were regenerated periodically whenever there was evidence of lower activity of polymerization. Both the 3A and 5A molecular sieve columns were regenerated in-house under nitrogen at a set temperature of 260° C. and 315° C., respectively. The molecular sieve material was purchased from Aldrich. Ethylene was delivered as a gas solubilized in the chilled solvent/monomer mixture. The purified solvents and monomers were then chilled to −15° C. by passing through a chiller before being fed into the reactors through a manifold. Solvent and monomers were mixed in the manifold and fed into reactor through a single tube. Catalyst and monomer contacts took place in the reactor. All liquid flow rates were measured using Brooksfield mass flow controllers.

The reactors were first prepared by continuously $N_2$ purging at a maximum allowed temperature, then pumping isohexane and scavenger solution through the reactor system for at least one hour. Monomers and catalyst solutions were then fed into the reactor for polymerization. Once the activity was established and the system reached equilibrium, the reactor was lined out by continuing operation of the system under the established condition for a time period of at least five times of mean residence time prior to sample collection. The resulting mixture, containing mostly solvent, polymer and unreacted monomers, was collected in a collection box. The collected samples were washed with xylene to remove unreacted macromonomers, and then air-dried in a hood to evaporate most of the solvent followed by drying in a vacuum oven at a temperature of 90° C. for 12 hours. The vacuum oven dried samples were weighed to obtain yields. All the reactions were carried out at a gauge pressure of 2.4 MPa.

The catalyst used in the first reactor for the production of vinyl terminated polypropylene was rac-dimethylsilylbis-2-methyl-3-propyl indenyl hafnium dimethyl (Catalyst 1 fed to reactor 1) and the activator was N,N-dimethylanilinium tetrakis (heptafluoro-2-naphthyl) borate. The catalyst used in the second reactor to copolymerize propylene and vinyl terminated polypropylene (Examples 1 and 2) or to copolymerize ethylene and vinyl terminated polypropylene (Examples 3 and 4) was bis(p-triethylsilylphenyl)carbyl(cyclopentadienyl)(2,7-di-t-butylfluorenyl) hafnium dimethyl (Catalyst 2 fed to reactor 2) activated by dimethylanilinium tetrakis(pentafluorophenyl)borate. Both catalysts were pre-activated with the activator at a molar ratio of 1:1 in 900 ml of toluene. All catalyst solutions were kept in an inert atmosphere and fed into reactors using an ISCO syringe pump. Tri-n-octylaluminum (TNOAL) solution (available from Sigma Aldrich, Milwaukee, Wis. was further diluted in isohexane and used as a scavenger. Scavenger feed rate was adjusted to maximize the catalyst efficiency.

Figure 2:
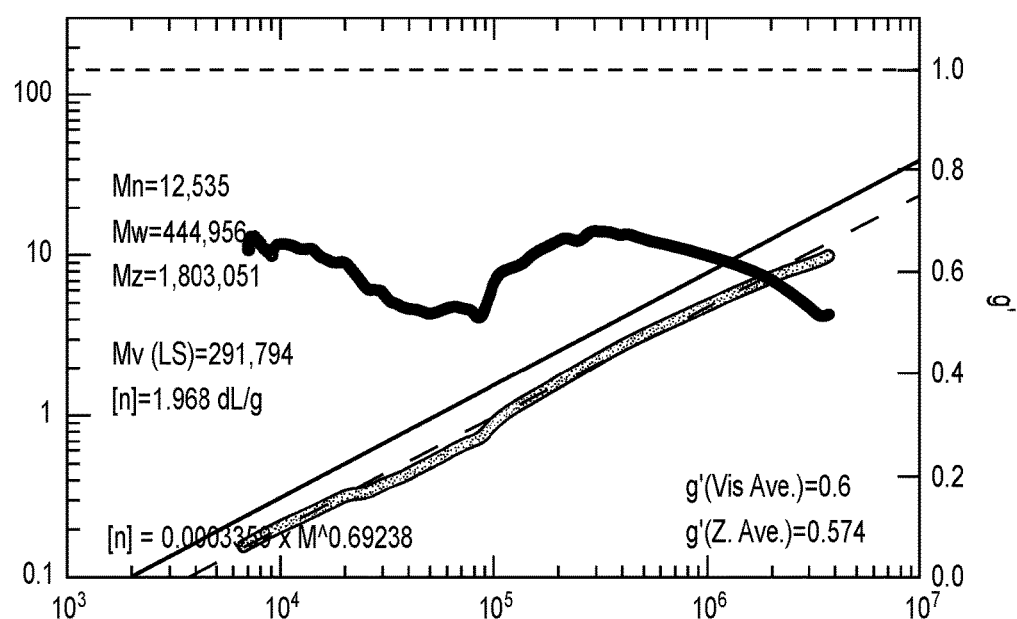
FIG. 2 depicts a GPC 3D plot of g' vs MW for Example 3 showing branching and macromer incorporation when ethylene was added in the feed.

In Examples 1-4, solvent, pre-activated Catalyst 1 solution, scavenger solution and propylene were fed into the first reactor to produce vinyl terminated polypropylene. Then the contents of the first reactor were transferred into the second reactor. Pre-activated catalyst 2 solution, no additional monomer (examples 1-2) or ethylene (examples 3-4) and additional solvent were fed into the second reactor. Although no monomer was fed to the second reactor in examples 1 and 2, unreacted propylene monomer from the first reactor is still present as the monomer for the second reactor. 10 gram of product was collected from the first reactor for characterization and calculation of yield. The final product was collected from the second reactor. The catalyst feed rate was adjusted to achieve the yield and monomer conversion. In Table 1, polymerization conditions and characterization results are tabulated. With only propylene feed in the first and second reactors, Examples 1 to 2, no macromer incorporation was noted at all using Catalyst 2 but when ethylene is fed to the second reactor, Examples 3 to 4, vinyl terminated macromers are incorporated based on the measurement results from branching index (GPC-3D), amount of long chain branches (C13 NMR), and rheology (See FIGS. 1 and 2). This helped to demonstrate the importance of ethylene sequence on the backbone which can allow the insertion of a macro-monomer, such as vinyl terminated polypropylene, and of larger dienes, such as ENB and VNB. Additionally, the presence of ethylene comonomer raises the catalyst efficiency and molecular weight capability which are considered for commercial production of amorphous low ethylene EPDM.

TABLE 1

Serial reactor polymerization conditions.

| Example | 1 | 2 | 3 | 4 |
|---|---|---|---|---|
| Reactor 1 | | | | |
| Volume (ml) | 500 | 500 | 500 | 500 |
| Temperature (C.) | 50 | 50 | 50 | 55 |
| Propylene feed rate (g/min) | 14 | 14 | 5 | 10 |
| Isohexane feed rate (g/min) | 16.7 | 16.7 | 16.7 | 16.7 |
| Catalyst 1 feed rate (mg/min) | 0.111 | 0.111 | 0.111 | 0.111 |
| Yield (g) | 55.7 | 55.7 | 39.3 | 31.7 |
| Conversion | 0.398 | 0.398 | 0.786 | 0.317 |
| Cat 1 efficiency (gpol/gcat) | 50130 | 50130 | 35370 | 28530 |
| Vinyl chain end (%) | 81 | 81 | 81 | 84 |
| GPC Mn | 21,925 | 21,925 | 11,517 | 17,791 |
| GPC PDI (Mw/Mn) | 2.34 | 2.34 | 2.53 | 6.39 |
| Reactor 2 | | | | |
| Volume (ml) | 1,000 | 1,000 | 1,000 | 1,000 |
| Temperature (C.) | 110 | 90 | 130 | 130 |
| Ethylene feed rate (liter/min) | 0 | 0 | 8 | 8 |
| Isohexane feed rate (g/min) | 52.5 | 52.5 | 52.5 | 52.5 |
| Catalyst 2 feed rate (mg/min) | 0.667 | 0.667 | 0.055 | 0.055 |
| Conversion | 0.40 | 0.41 | 0.83 | 0.82 |
| Cat 2 efficiency (gpol/gcat) | 7213 | 7316 | 70240 | 93996 |
| Final product MW (Weight average) | 58K | 312K | 328K | 273K |
| Macromer incorporation | None | None | Many | Many |

Synthesis of Amorphous Low Ethylene EPDM in a 0.15 Liter Continuous Reactor

Catalyst 2 precursor, as discussed above, bis((4-triethylsilyl)phenyl)methylene(cyclopentadienyl)(2,7-di-tert-butyl-fluoren-9-yl)hafnium dimethyl was used. Other Cs symmetry metallocene precursors with good diene incorporation and MW capabilities could also be used such as those described herein. It was activated with dimethylanilinium tetrakis(pentafluorophenyl)borate, but dimethylanilinium-tetrakis(heptafluoronaphthyl)borate and other non-coordinating anion type activators or MAO could also be used.

Polymerization experiments were performed in a continuous stirred tank reactor (CSTR) made by Autoclave Engineers, Erie Pa. The reactor was designed to operate at a maximum pressure and temperature of 2000 bar (30 kpsi) and 225° C., respectively, although the current experiments the nominal reactor pressures were lower, from 1600 to 1700 psig. The nominal reactor vessel volume was 150 mL. The reactor was equipped with a magnetically coupled stirrer drive (Magnedrive). A pressure transducer measured the pressure in the reactor. The reactor temperature was measured using a type-K thermocouple. A flush-mounted rupture disk located on the side of the reactor provided protection against catastrophic pressure failure. All product lines were heated to ~120° C. to prevent fouling. The reactor had an electric heating band that was controlled by a programmable logic control device (PLC). Except for the heat losses to the environment, the reactor did not have cooling (close to adiabatic operations).

The conversion in the reactor was monitored by an on-line gas chromatograph (GC) that sampled both the feed and the effluent. The GC analysis utilized the propane impurity present in the propylene feed as internal standard. The reactor temperature and the temperature difference across the reactor wall was maintained constant by adjusting the reactor heater output (skin temperature) and the catalyst feed rate. The target reactor temperature was maintained at 0.5-3.0 mol ppm catalyst concentrations in the feed. At these low catalyst concentrations, impurity control was the most critical factor in achieving controlled, steady state reactor conditions. Feed purification traps were used to control impurities carried by the monomer feed. The purification traps were placed right before the feed pumps and comprised of two separate beds in series: activated copper (reduced in flowing $H_2$ at 225° C. and 1 bar) for $O_2$ removal followed by a molecular sieve (5A, activated in flowing $N_2$ at 270° C.) for water removal.

Propylene was fed from a low-pressure cylinder equipped with a dip leg for liquid delivery to the reactor. A heating blanket (Ace) was used to increase the propylene cylinder head pressure to approx. 17 bar (~250 psig). This increased head pressure allowed the monomer to be delivered to the monomer feed pump head at a pressure above its bubble point at the pump. The low-pressure monomer feed was also stabilized against bubble formation by cooling the pump head using 10° C. chilled water. The purified monomer feed was fed by a two-barrel continuous ISCO pump (model 500D). The monomer flow rate was adjusted by adjusting the motor speed of the pump and was measured by a Coriolis mass flow meter (Model PROline Promass 80, Endress and Hauser).

The catalyst feed solution was prepared inside an argon-filled dry box (Vacuum Atmospheres). The atmosphere in the glove box was purified to maintain <1 ppm $O_2$ and <1 ppm water. All glassware was oven-dried for a minimum of 4 hours at 110° C. and transferred hot to the antechamber of the dry box. Stock solutions of the catalyst precursor and the activator were prepared using purified toluene that was stored in amber bottles inside the dry box. Aliquots were taken to prepare fresh activated catalyst solutions. The activated catalyst solution was charged inside the argon-filled dry box to a heavy-walled glass reservoir (Ace Glass, Inc. Vineland, N.J.) and was pressurized to 5 psig with argon. The activated catalyst solution was delivered to the unit by a custom made two-barrel continuous high-pressure syringe pump (PDC Machines).

HPLC grade hexane (95% n-hexane, J. T. Baker) was used as solvent. It was purged with nitrogen for a minimum of four hours then passed through a series of Cu and mol sieve beds (similar to the ones used for the propylene feed, see above) and finally was filtered once over activated basic alumina. The filtered hexane was stored in a 4-liter glass vessel (Ace Glass, Vineland, N.J.) inside an argon-filled dry box. The hexane was further purified by adding 1.5 mL (1.05 g) of trioctylaluminum solution (Aldrich #38,655-3) to the 4-liter reservoir of filtered hexane. 5-10 psig head pressure of argon was applied to the glass vessel to deliver the scavenger-treated solvent to a metal feed vessel from which the hexane was delivered to the reactor by a two-barrel continuous ISCO pump (model 500D). Ethylidene norbornene (ENB) was purified by filtering through activated basic alumina. The filtered ENB was stored in a 4-liter glass vessel (Ace Glass, Vineland, N.J.) inside an argon-filled dry box. 5-10 psig head pressure of argon was applied to the glass vessel to deliver the scavenger solution to a 500 mL single-barrel ISCO pump, which in turn fed diene to the reactor. Polymerization grade ethylene was compressed by a Fluitron A%-200 compressor and metered by a mass flow meter into the reactor.

During a polymerization experiment, the reactor was preheated to ~10-15° C. below that of the desired reaction temperature, ranging from 86 to 111° C. Once the reactor reached the preheat temperature, the solvent pump was turned on to deliver hexane/trioctylaluminum scavenger solution to the reactor from the 4-liter scavenger solution feed vessel. This stream of scavenger/catalyst solution entered the reactor through a port on the top of the stirrer assembly to keep the polymer from fouling the stirrer drive. After the flow of solvent to the reactor was verified by monitoring the amount of solvent taken from the feed vessel, the monomer feeds were turned on. The monomers were fed to the reactor through a side port. The reactor was purged when the pressure increased to ~100 bar (~1.5 kpsi) by opening each valve briefly. This reduced the pressure in the reactor and verified that all ports in the reactor were operational. After all valves had been tested and the reactor reached the desired reaction pressure, the syringe pump containing the activated catalyst solution was pressurized. When the syringe pump pressure exceeded the reactor pressure by 27 bar (~400 psi) an air actuated solenoid valve was opened to allow the catalyst solution to mix with the stream of flowing solvent upstream of the reactor. The arrival of the catalyst to the reactor was indicated by an increase in the reaction temperature caused by the exothermic polymerization reaction. A mass balance calculation method well known in the art of chemical engineering was used to calculate the feed compositions and effluent polymer contents. To prepare Examples 5 to 27, the solvent used ranging from 55-66 wt % by weight, propylene ranging from 29 to 43 wt % by weight, ethylene ranging from 0.5 to 5.5 wt % by weight, ENB ranging from 0.1 to 14 wt % by weight, and polymer in the reactor ranging from 5 to 14 wt % by weight. Propylene=29-43 wt. During the line-out period, the catalyst feed rate was adjusted to reach and maintain the target reaction temperature and conversion. The products were collected and weighed after vacuum-drying overnight at 70° C. Aliquots of the product were used for characterization without homogenizing the entire product yield. Examples 5 to 27 were prepared and their characterization results are shown below. All of them are amorphous with zero crystallinity.

TABLE 2

Compositions of amorphous low ethylene EPDM prepared in a 0.15 liter continuous reactor

| Examples | C2 (wt %) | C3 (wt %) | ENB (wt %) | MFR | Tg (DSC) |
|---|---|---|---|---|---|
| 5 | 23.5 | 76.5 | 20.5 | 3.164 | −16.96 |
| 6 | 24 | 76 | 20.6 | 3.06 | −18.32 |
| 7 | 15.6 | 84.4 | 1.3 | 0.13 | −27 |
| 8 | 14.8 | 85.2 | 0.5 | 7.45 | NA |
| 9 | 15.1 | 84.9 | 0.4 | 3.33 | NA |
| 10 | 16.7 | 83.3 | 11.8 | 13.71 | −17.388 |
| 11 | 13.7 | 86.3 | 3 | 1.52 | −18.96 |
| 12 | 13.1 | 86.9 | NA | 0.51 | −18.26 |
| 13 | 11.4 | 88.6 | 2.8 | 1.02 | −17.25 |
| 14 | 11.8 | 88.2 | 3.5 | 1.07 | −16.54 |
| 15 | 12 | 88 | 3.5 | 1 | −16.75 |
| 16 | 10.4 | 89.6 | 3 | 5.43 | −14.02 |
| 17 | 11.1 | 88.9 | NA | 1.52 | −16.21 |
| 18 | 10.5 | 89.5 | 2.7 | 5.03 | −14.89 |
| 19 | 10.1 | 89.9 | 5.2 | 2.93 | −12.52 |
| 20 | 12.8 | 87.2 | 4.3 | 9.38 | −11.71 |
| 21 | 10.6 | 89.4 | 3.1 | 0.96 | −14.72 |
| 22 | 10.7 | 89.3 | 5.3 | 3.33 | −12.81 |
| 23 | 5.2 | 94.8 | 3.6 | 3.6 | −4 |
| 24 | 3.9 | 96.1 | 4.2 | 1.9 | −6.3 |
| 25 | 4.2 | 95.8 | 4.3 | 0.4 | −4 |
| 26 | 3.5 | 96.5 | 3.3 | 0.1 | −4 |
| 27 | 2.7 | 97.3 | 2.5 | 0.4 | −2 |

MFR (melt flow rate) measurements were obtained using a Dynisco Kayeness Polymer Test Systems Series 4003 apparatus following ASTM D1238 method.

DSC measurements were obtained by heating the sample to 210° C.; under $N_2$ at 10° C./min. The sample is held at 210° C. for 5 minutes and cooled down at 10° C./min to −40° C. During the cooling cycle, the Tg is measured. After holding the sample at −40° C. for 5 min, the sample is heated up at 10° C./min to 210° C. During this second heating cycle, the melting and crystallinity are measured if there is crystallinity present in the sample.

Synthesis of Amorphous Low Ethylene EPDM in a 0.5 Liter Continuous Reactor

Examples 28-49 were produced using a solution process in a 0.5-liter continuous stirred-tank reactor (autoclave reactor). The autoclave reactor was equipped with a stirrer, a water-cooling/steam-heating element with a temperature controller, and a pressure controller. Solvents and monomers were first purified by passing through a three-column purification system. Purification columns were regenerated periodically whenever there was evidence of low catalyst activity. Isohexane was used as a solvent. It was fed into the reactor using a Pulsa pump and its flow rate was controlled by adjusting the outflow at the pump (using a calibration curve). The compressed, liquefied propylene feed was controlled by a mass flow controller. Ethylene was mixed with propylene before the reactor and fed to the manifold. A mixture of isohexane and tri-n-octylaluminum (TNOAL) and ethylene norbornene (ENB) was also added to the manifold through a separate line and the combined mixture of monomers and solvent was fed into the reactor using a single tube.

Catalyst used in these examples was Catalyst 2 as discussed above activated by N,N-dimethylanilinium tetrakis (pentafluorophenyl) borate. Both the catalyst and activator were first dissolved in toluene and the solutions were kept in an inert atmosphere. The solutions of catalyst and activator were premixed and fed into the reactor using an ISCO syringe pump. The catalyst to activator feed ratio (molar) was set at 0.98. The collected samples were first placed on a boiling-water steam table in a hood to evaporate a large fraction of the solvent and unreacted monomers, and then, dried in a vacuum oven at a temperature of ~90° C. for 12-18 hours. The vacuum oven dried samples were weighed to obtain yields. Ethylene, propylene, and ENB conversions for each sample were calculated using the polymer production rate, composition, and monomer feed rates. Catalyst activity (also known as catalyst productivity) was calculated using the polymer production rate and catalyst feed rate. All reactions were carried out at a gauge pressure of 2.2 MPa and at temperatures from 100 to 120° C. Compositions of these amorphous low ethylene EPDM (with zero crystallinity) thus prepared are shown in Table 3. To prepare those amorphous EPDM, the feed rates of ethylene were from 0.35 to 0.6 g/min, the feed rates of propylene were from 5 to 14 g/min, and the feed rates of ENB were from 1 to 5.7 g/min. Compositions of these amorphous low ethylene EPDM (with zero crystallinity) thus prepared are shown in Table 3.

TABLE 3

Compositions of amorphous low ethylene EPDM prepared in a 0.5 liter continuous reactor

| Examples | C2 (wt %) | C3 (wt %) | ENB (wt %) | MFR | Tg (DSC) |
|---|---|---|---|---|---|
| 28 | 18.3 | 81.7 | 0.4 | 0.49 | N/A |
| 29 | 12.9 | 87.1 | 0.6 | 0.64 | N/A |
| 30 | 9.9 | 90.1 | 0.9 | 0.87 | N/A |
| 31 | 6.9 | 93.1 | 0.8 | 0.48 | N/A |

TABLE 3-continued

Compositions of amorphous low ethylene EPDM prepared in a 0.5 liter continuous reactor

| Examples | C2 (wt %) | C3 (wt %) | ENB (wt %) | MFR | Tg (DSC) |
|---|---|---|---|---|---|
| 32 | 12.8 | 87.2 | 0.8 | 1.42 | N/A |
| 33 | 13.9 | 86.1 | 5.9 | 1.18 | N/A |
| 34 | 12.8 | 87.2 | 3.9 | >350 | N/A |
| 35 | 7.4 | 92.6 | 3.8 | 1.14 | N/A |
| 36 | 8.3 | 91.7 | 4 | 2.27 | N/A |
| 37 | 10.2 | 89.8 | 4.3 | 0.51 | −11.4 |
| 38 | 10.5 | 89.5 | 3.7 | 0.23 | −11.6 |
| 39 | 9.2 | 90.8 | 3.6 | 0.29 | −11.2 |
| 40 | 9.5 | 90.5 | 3.1 | 0.31 | −11.4 |
| 41 | 10.2 | 89.8 | 8.7 | 0.92 | N/A |
| 42 | 10.2 | 89.8 | 10 | 1.33 | N/A |
| 43 | 10.9 | 89.1 | 7.3 | 1.27 | N/A |
| 44 | 11.8 | 88.2 | 10.2 | 1.49 | −6 |
| 45 | 21.9 | 78.1 | 7.5 | 1.56 | N/A |
| 46 | 9.3 | 90.7 | 6 | 1.05 | −8.7 |
| 47 | 13.2 | 86.8 | 6.7 | 1.17 | −9 |
| 48 | 9.9 | 90.1 | 3.9 | 0.56 | −11.4 |
| 49 | 10.05 | 89.95 | 3.2 | 0.9 | −12 |

Now, having described the propylene-ethylene-diene terpolymers tire tread compositions, described herein in numbered paragraphs is:

1. A propylene-ethylene-diene terpolymer comprising from 2% to 25% by weight of ethylene, from 98% to 75 wt % by weight propylene and from 1% to 21 wt % by weight of a diene, wherein the terpolymer has a crystallinity of less than 3%, a melt flow rate (MFR) of less than 10 and a Tg by DSC of from −2° C. to −25° C.
2. The propylene-ethylene-diene terpolymer of numbered paragraph 1, wherein the percentage ethylene is from 4 percent to 20 percent.
3. The propylene-ethylene-diene terpolymer of numbered paragraphs 1 and 2, wherein the percentage propylene is from 80 percent to 96 percent.
4. The propylene-ethylene-diene terpolymer of any of numbered paragraphs 1 through 3, wherein the diene comprises 5-ethylidene-2-norbornene (ENB), 1,4-hexadiene; 5-methylene-2-norbornene (MNB), 1,6-octadiene, 5-methyl-1,4-hexadiene, 3,7-dimethyl-1,6-octadiene, 1,3-cyclopentadiene, 1,4-cyclohexadiene, vinyl norbornene (VNB) or mixtures thereof.
5. The propylene-ethylene-diene terpolymer of numbered paragraph 4, wherein the diene is 5-ethylidene-2-norbornene.
6. The propylene-ethylene-diene terpolymer of any one of the previous numbered paragraphs, wherein the Tg is from −4° C. to −25° C.
7. The propylene-ethylene-diene terpolymer of any one of the previous numbered paragraphs, wherein the MFR is from 0.1 to 5.
8. The propylene-ethylene-diene terpolymer of any one of the previous numbered paragraphs, wherein the crystallinity is less than 2%.
9. The propylene-ethylene-diene terpolymer of numbered paragraph 8, wherein the crystallinity is less than 1%.
10. The propylene-ethylene-diene terpolymer of any one of the previous numbered paragraphs, wherein the terpolymer is prepared with a Cs symmetry metallocene catalyst and an activator.
11. The propylene-ethylene-diene terpolymer of numbered paragraph 10, wherein the metallocene catalyst is bis(p-triethylsilylphenyl)carbyl(cyclopentadienyl)(2,7-di-t-butylfluorenyl) hafnium dimethyl.
12. The propylene-ethylene-diene terpolymer of numbered paragraph 11, wherein the activator comprises dimethylanilinium tetrakis(pentafluorophenyl)borate, dimethylanilinium-tetrakis(heptafluoronaphthyl)borate, a non-coordinating anion type activator, or MAO.
13. A tire tread composition comprising components, by weight of the composition, within the range from:
   5 to 75 wt % by weight of a diene elastomer;
   0 to 40 wt % by weight of processing oil;
   20 to 80 wt % by weight of filler;
   a curative agent; and
   5 to 30 wt % by weight of an propylene-ethylene-diene terpolymer of any of claims 1 through 12.
14. The tire tread composition of numbered paragraph 13, wherein the filler is a silica-based filler.
15. The tire tread composition of numbered paragraphs 13-14, wherein the filler is a carbon black filler.
16. The tire tread composition of numbered paragraphs 13-15, wherein the filler is blend of silica-based filler and a carbon black filler.
17. The tire tread composition of numbered paragraphs 13-16, wherein the diene elastomer is a styrenic copolymer, a polybutadiene, natural rubber, a polyisoprene, a butadiene copolymer, an isoprene copolymer or blends thereof.
18. A tire tread comprising the cured reaction product of the components, by weight of the composition, within the range from:
   5 to 75 wt % by weight of a diene elastomer;
   0 to 40 wt % by weight of processing oil;
   20 to 80 wt % by weight of filler;
   a curative agent; and
   5 to 30 wt % by weight of an propylene-ethylene-diene terpolymer of any one of previous numbered paragraphs 1 through 12.
19. The tire tread composition of numbered paragraph 18, wherein the filler is a silica-based filler.
20. The tire tread composition of numbered paragraphs 18-19, wherein the filler is a carbon black filler.
21. The tire tread composition of numbered paragraphs 18-20, wherein the filler is blend of silica-based filler and a carbon black filler.
22. The tire tread composition of numbered paragraphs 18-21, wherein the diene elastomer is a styrenic copolymer, a polybutadiene, natural rubber, a polyisoprene, a butadiene copolymer, an isoprene copolymer or blends thereof.
23. A method for making a propylene-ethylene-diene composition comprising combining a catalyst precursor and an activator at a temperature within a range from 50° C. to 180° C. in solution with ethylene, a C3 to C12 α-olefin, and a non-conjugated diene having two polymerizable double bonds; where the catalyst precursor is selected from the group consisting of Cs-symmetric Group 4 metallocenes comprising any two ligands selected from cyclopentadienyl ligands and ligands isolobal to cyclopentadienyl.
24. The method of numbered paragraph 23, wherein the ligands isolobal to cyclopentadienyl are selected from cyclopentadienyl, cyclopentaphenanthrenyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl), substituted versions thereof, and heterocyclic versions thereof.
25. The method of numbered paragraphs 23-24, wherein the catalyst precursor is selected from Cs-symmetric ansametallocenes.
26. The method of numbered paragraphs 23-25, wherein the bridging group comprises at least one phenyl group, alkyl substituted phenyl group, or silyl substituted phenyl group.
27. The method of numbered paragraphs 23-26, wherein the catalyst precursor is bis((4-triethylsilyl)phenyl)methylene (cyclopentadienyl)(2,7-di-tert-butyl-fluoren-9-yl) hafnium dimethyl.
28. The method of numbered paragraphs 23-27, wherein the activator comprises tetra(perfluorinated aromatic)borates.
29. The method of numbered paragraph 28, wherein the tetra(perfluorinated aromatic)borate comprises anions selected from tetra(pentafluorophenyl)borate, tetra(perfluorobiphenyl)borate, tetra(perfluoronaphthyl)borate, and combinations thereof.
30. The method of numbered paragraph 28, wherein the activator also comprises a bulky organic cation.
31. The method of numbered paragraph 30, wherein the bulky organic cation is a dialkylanilinium cation or a triphenylmethyl cation.

Also disclosed is the use of the inventive propylene-ethylene-diene terpolymer in a tire tread composition as described.

In the specification and in the claims, the terms "including" and "comprising" are open-ended terms and should be interpreted to mean "including, but not limited to." These terms encompass the more restrictive terms "consisting essentially of" and "consisting of"

It must be noted that as used herein and in the appended claims, the singular forms "a," "an," and "the" include plural reference unless the context clearly dictates otherwise. As well, the terms "a" (or "an"), "one or more" and "at least one" can be used interchangeably herein. It is also to be noted that the terms "comprising," "including," "characterized by" and "having" can be used interchangeably.

The invention claimed is:

1. A propylene-ethylene-diene terpolymer comprising from 2% to 25% by weight of ethylene, from 98% to 75% by weight propylene and from 1% to 21% by weight of a diene, wherein the terpolymer has a crystallinity of less than 3%, a melt flow rate (MFR) of less than 10 g/10 min, and a Tg by DSC of from −2° C. to −25° C., and wherein the terpolymer does not comprise isotactic polypropylene sequences.

2. The propylene-ethylene-diene terpolymer of claim 1, wherein the percentage ethylene is from 4 percent to 20 percent.

3. The propylene-ethylene-diene terpolymer of claim 1, wherein the percentage propylene is from 80 percent to 96 percent.

4. The propylene-ethylene-diene terpolymer of claim 1, wherein the diene comprises 5-ethylidene-2-norbornene (ENB), 1,4-hexadiene; 5-methylene-2norbornene (MNB), 1,6-octadiene, 5-methyl-1,4-hexadiene, 3,7-dimethyl-1,6-octadiene, 1,3-cyclopentadiene, 1,4-cyclohexadiene, vinyl norbornene (VNB) or mixtures thereof.

5. The propylene-ethylene-diene terpolymer of claim 4, wherein the diene is 5ethylidene-2-norbornene.

6. The propylene-ethylene-diene terpolymer of claim 1, wherein the Tg is from −4° C. to −25° C.

7. The propylene-ethylene-diene terpolymer of claim 1, wherein the MFR is from 0.1 to 5 g/10 min.

8. The propylene-ethylene-diene terpolymer of claim 1, wherein the crystallinity is less than 2%.

9. The propylene-ethylene-diene terpolymer of claim 8, wherein the crystallinity is less than 1%.

10. A tire tread composition comprising components, by weight of the composition, within the range from:
    5 to 75% by weight of a diene elastomer;
    0 to 40% by weight of processing oil;
    20 to 80% by weight of filler; a
    curative agent; and
    5 to 30% by weight of an propylene-ethylene-diene terpolymer of claim 1.

11. The tire tread composition of claim 10, wherein the filler is a silica-based filler.

12. The tire tread composition of claim 10, wherein the filler is a carbon black filler.

13. The tire tread composition of claim 10, wherein the filler is blend of silica-based filler and a carbon black filler.

14. The tire tread composition of claim 10, wherein the diene elastomer is a styrenic copolymer, a polybutadiene, natural rubber, a polyisoprene, a butadiene copolymer, an isoprene copolymer or blends thereof.

15. A propylene-ethylene-diene terpolymer comprising from 2% to 25% by weight of ethylene, from 98% to 75% by weight propylene and from 1% to 21% by weight of a diene, wherein the terpolymer has a crystallinity of less than 3%, a melt flow rate (MFR) of less than 10 g/10 min, and a Tg by DSC of from −2° C. to −25° C., wherein the terpolymer does not comprise isotactic polypropylene sequences, and wherein the terpolymer has a g' index value of 0.95 or greater.

16. The propylene-ethylene-diene terpolymer of claim 15, wherein the percentage ethylene is from 4 percent to 20 percent.

17. The propylene-ethylene-diene terpolymer of claim 15, wherein the percentage propylene is from 80 percent to 96 percent.

18. The propylene-ethylene-diene terpolymer of claim 15, wherein the diene comprises 5-ethylidene-2-norbornene (ENB), 1,4-hexadiene; 5-methylene-2norbornene (MNB), 1,6-octadiene, 5-methyl-1,4-hexadiene, 3,7-dimethyl-1,6-octadiene, 1,3-cyclopentadiene, 1,4-cyclohexadiene or mixtures thereof.

19. The propylene-ethylene-diene terpolymer of claim 18, wherein the diene is 5-ethylidene-2-norbornene.

20. The propylene-ethylene-diene terpolymer of claim 15, wherein the Tg is from −4° C. to −25° C.

21. The propylene-ethylene-diene terpolymer of claim 15, wherein the MFR is from 0.1 to 5 g/10 min.

22. The propylene-ethylene-diene terpolymer of claim 15, wherein the crystallinity is less than 2%.

23. The propylene-ethylene-diene terpolymer of claim 22, wherein the crystallinity is less than 1%.

* * * * *